United States Patent
Venkatesan et al.

(10) Patent No.: US 9,063,961 B2
(45) Date of Patent: **\*Jun. 23, 2015**

(54) HIGH-PERFORMANCE, SCALABLE, ADAPTIVE AND MULTI-DIMENSIONAL EVENT REPOSITORY

(71) Applicant: Oracle International Corporation, Redwood Shores, CA (US)

(72) Inventors: Ramkumar Venkatesan, Domlur (IN); Anand Lakshminath, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,154

(22) Filed: Jan. 13, 2014

(65) Prior Publication Data

US 2014/0129515 A1    May 8, 2014

Related U.S. Application Data

(60) Continuation of application No. 12/649,209, filed on Dec. 29, 2009, now Pat. No. 8,631,024, which is a division of application No. 11/330,431, filed on Jan. 11, 2006, now Pat. No. 7,664,784.

(51) Int. Cl.
| | |
|---|---|
| *G06F 7/00* | (2006.01) |
| *G06F 17/00* | (2006.01) |
| *G06F 17/30* | (2006.01) |

(52) U.S. Cl.
CPC .... *G06F 17/30289* (2013.01); *G06F 17/30575* (2013.01)

(58) Field of Classification Search
CPC .................. G06F 17/30156; G06F 17/30159; G06F 17/30097
USPC ........................................................ 707/609
See application file for complete search history.

(56) References Cited

U.S. PATENT DOCUMENTS

| | | | |
|---|---|---|---|
| 5,519,690 A | 5/1996 | Suzuka et al. | |
| 6,366,926 B1 | 4/2002 | Pohlmann et al. | |
| 6,446,136 B1 | 9/2002 | Pohlmann et al. | |
| 6,741,980 B1 * | 5/2004 | Langseth et al. | 1/1 |
| 6,823,357 B1 * | 11/2004 | Du et al. | 709/203 |

(Continued)

OTHER PUBLICATIONS

U.S. Appl. No. 11/330,431, "Final Office Action", Jul. 1, 2009, 12 pages.

(Continued)

*Primary Examiner* — Binh V Ho
(74) *Attorney, Agent, or Firm* — Kilpatrick, Townsend & Stockton, LLP

(57) ABSTRACT

A High-Performance, Scalable, Adaptive and Multi-dimensional Event Repository is described and utilized in a method for publishing an event in a database. The present method includes transparently intercepting a request to a database to publish an event. A messaging system operable with the database intercepts the request. The present method further includes examining an event repository for a template of the event. The event repository is operable with the database and the messaging system. The present method additionally includes retrieving the event template from the event repository. The present method also includes marshaling the event template to create the event. The present method also includes publishing the event in an event queue.

18 Claims, 8 Drawing Sheets

(56) References Cited

U.S. PATENT DOCUMENTS

| | | | |
|---|---|---|---|
| 6,976,031 B1 * | 12/2005 | Toupal et al. | 1/1 |
| 7,107,497 B2 | 9/2006 | Mcguire et al. | |
| 7,289,795 B2 * | 10/2007 | Ma et al. | 455/414.1 |
| 7,395,322 B2 | 7/2008 | Harvey et al. | |
| 7,464,147 B1 | 12/2008 | Fakhouri et al. | |
| 7,475,406 B2 | 1/2009 | Banatwala et al. | |
| 7,664,784 B2 | 2/2010 | Venkatesan et al. | |
| 8,631,024 B2 | 1/2014 | Venkatesan et al. | |
| 2002/0112058 A1 | 8/2002 | Weisman et al. | |
| 2002/0194287 A1 | 12/2002 | Tyra et al. | |
| 2003/0018521 A1 | 1/2003 | Kraft et al. | |
| 2003/0061365 A1 | 3/2003 | White et al. | |
| 2003/0167250 A1 * | 9/2003 | Sash | 707/1 |
| 2005/0015427 A1 | 1/2005 | Guo et al. | |
| 2006/0031572 A1 | 2/2006 | Feuerstein et al. | |
| 2006/0143034 A1 | 6/2006 | Rothermel et al. | |
| 2007/0136080 A1 * | 6/2007 | Jones | 705/1 |
| 2007/0162511 A1 | 7/2007 | Venkatesan et al. | |
| 2007/0244571 A1 | 10/2007 | Wilson et al. | |
| 2008/0288466 A1 | 11/2008 | Eisenberger et al. | |
| 2009/0043809 A1 | 2/2009 | Fakhouri et al. | |
| 2010/0169350 A1 | 7/2010 | Venkatesan et al. | |

OTHER PUBLICATIONS

U.S. Appl. No. 11/330,431 , "Non Final Office Action", Oct. 6, 2008, 9 pages.

U.S. Appl. No. 11/330,431 , "Notice of Allownace", Oct. 2, 2009, 13 pages.

U.S. Appl. No. 11/330,431 , "Restriction Requirement", Apr. 13, 2009, 5 pages.

U.S. Appl. No. 12/649,209 , "Notice of Allowance", Sep. 12, 2013.

U.S. Appl. No. 12/649,209 , "Office Action", Dec. 12, 2011, 20.

U.S. Appl. No. 12/649,209 , "Office Action", Aug. 1, 2012, 21.

U.S. Appl. No. 12/649,209 , "Office Action", Mar. 7, 2013, 22 Pages.

* cited by examiner

HIGH-PERFORMANCE, SCALABLE, ADAPTIVE AND MULTI-DIMENSIONAL EVENT REPOSITORY

CROSS-REFERENCE TO RELATED APPLICATIONS

This application is a continuation of U.S. Pat. No. 8,631,024, filed Dec. 29, 2009, titled "HIGH-PERFORMANCE, SCALABLE, ADAPTIVE AND MULTI-DIMENSIONAL EVENT REPOSITORY," which is a Divisional of U.S. Pat. No. 7,664,784, filed on Jan. 11, 2006, titled "HIGH-PERFORMANCE, SCALABLE, ADAPTIVE AND MULTI-DIMENSIONAL EVENT REPOSITORY," the contents of each are hereby incorporated in their entirety by reference.

TECHNICAL FIELD

Embodiments of the present disclosure are related to database systems. More particularly, the present disclosure relates to event storage operable in and associated with a database.

BACKGROUND ART

In a computer system or in a network of computer systems, a common mechanism for storing and sharing units of information/data is through the utilization of a database. A database is a collection of information that has been organized to facilitate accessing, managing and updating. Commonly implemented database types can include, but are not limited to, flat model, network model, distributed model and relational databases.

Many database types can be a combination of instance and data storage in which an instance may consist of a set of operating system processes and memory structures that interact with the storage. PMON (process monitor) and SMON (system monitor) are typical system processes. The memory structure is commonly called the SGA (System Global Area) which typically retains cache information including, but not limited to, user data, data buffers, and SQL (structured query language). In addition to instance and data storage, many databases may include redo logs. Redo logs retain transactional history (e.g., an online redo log) and can be archived into archive logs (e.g., an off line redo log), both of which are critical for the recovery of data.

Included in some database types is a database messaging system that enables propagating, managing and sharing of data and units of information. The propagating, managing and sharing can be within a database or from one database to another database. A unit of information, also referred to as an event, may be a database change or an application generated message. The messaging system, or event notification system provides a unified framework for processing events. Events generated in applications, in workflow or implicitly captured from redo logs or database triggers can be captured in a queue. These events can be consumed in a variety of ways. Events can be automatically applied with a user-defined function or database table operation, can be explicitly de-queued, or a notification can be sent to the consuming application. If the consuming application is located on another database, then the messaging system automatically propagates the events to the appropriate database.

Publishers/subscribers to the database can share these events through utilization of a messaging system. The publisher/subscriber can control what events are put into the messaging system, how the messaging system flows or is routed from database to database, what happens to messages in the messaging system as the messages flow into each database and how the messaging system terminates.

Predicated upon publisher/subscriber specifications, a messaging system may capture, stage and manage messages in the database automatically including, but not limited to, data manipulation language (DML) changes and data definition language (DDL) changes. A publisher/subscriber can also enter user-defined messages in the messaging system, and the messaging system can propagate the messages to other databases or applications automatically. When messages reach a destination database, the messaging system can consume them based on publisher/subscriber specifications.

In such a publish/subscribe environment, there is a constant inflow of published events which are then consumed by the subscribers. These events may be transformed into other events depending upon the subscriber's expressed intent. The lifetime of an event may be described as event creation, event consumption and, optionally, event transformation. The shape and size of the events are dependent upon the data that is flowing through the messaging system.

Database changes are logged persistently to redo log files. It is noted that in many databases, the redo log can be quite substantial in size and volume. These redo log files are continually mined to extract new changes, construct a corresponding event for the change and then publish the event in a database queue for interested subscribers. Additionally, the number or volume of events in the redo log, from which the messaging system retrieves an event, may cause the messaging system to utilize substantial system resources in the publication and consumption of these events.

In a high performance environment in which a messaging system is implemented, the critical stages of event processing, e.g., creation, consumption and optionally transformation, need to be optimal. In particular, when event throughput is varied and high volume (thousands of events per second), the critical stages of event processing can consume substantial system resources including, but not limited to, processor usage, memory usage and bandwidth. Further, in a high performance environment that deals with thousands of events per second, the creation, transformation and consumption of events can be a significant portion of the lifetime of the event. Specifically, creation and marshaling (e.g., transformation) may cause the bulk of the event processing time. These critical stages can adversely affect the scalability of the messaging system.

Further, events can be arbitrarily complex and they can be nested such that an event may be comprised of sub-events, within sub-events, within the event, e.g., having a hierarchical form. An event can also have a subdivided form including sub-events that can include a collection of sub-events, taking a large hierarchical form. During an event creation process, the messaging system examines the entire structure of the event, creates the event each time a value is to be set for that event, and performs a memory allocation for that event. During an event destroy process, the messaging system has to examine the entire memory allocation for that event.

When there is a constant allocation and de-allocation of small pieces of RAM, it can lead to memory fragmentation. This may prevent the database messaging system from allocating contiguous blocks of RAM. Memory fragmentation can cause, but is not limited to, elevated central processing unit (CPU) usage and increased retrieval time leading to higher latency in marshaling events. This can cause a chain reaction in other modules and introduce significant latencies into the entire event processing framework.

Thus, many current databases and associated messaging systems may not provide an efficient mechanism for event storage and/or retrieval of the events. Accordingly, there exists a need for a high-performance scalable, adaptable multi-dimensional event repository for utilization in conjunction with a database messaging system's storing and retrieving of events.

DISCLOSURE OF THE DISCLOSURE

Accordingly, embodiments of the present disclosure are drawn to providing a method and system employing a high-performance scalable, adaptable, multi-dimensional event repository. In one example, the event repository stores events that have expired and/or have been destroyed by the event notification architecture. Rather than being destroyed, these events are kept in the event repository. The events are then available for use in efficiently generating new events of like kind. Embodiments of the present disclosure further provide for scalability of the event repository in response to the volume of events and system traffic. Embodiments of the present disclosure also provide for adaptability of the event repository in response to various types of events. Embodiments of the present disclosure additionally provide multi-dimensionality in response to the differing shapes and sizes of various events.

In an embodiment of the present disclosure, a method for publishing an event in a database is described. The present method includes transparently intercepting a request to a database to publish an event. The request is intercepted by a messaging system operable with the database. The present method further includes examining an event repository for a template of the event. The event repository is operable with the database and the messaging system. The present method additionally includes retrieving a matching event template from the event repository. The present method additionally includes retrieving the event template from the event repository. The present method also includes marshaling the event template to create the event. The present method also includes publishing the event in an event queue.

It is appreciated that the event repository becomes populated with events as they are destroyed from the event notification infrastructure of the database.

In another embodiment of the present disclosure, a method for utilizing an event repository is described. The present method includes receiving an indication that all subscribers of a database expressing an interest in the event have consumed the event. The present method further includes removing the event from an event queue in response to receiving the indication. The present method also includes placing the event in an event repository upon removing the event from the event queue. The event is placed in the event repository to facilitate publication of a subsequent request similar to the event.

As described further below, the event repository is adaptive, scalable, multidimensional, and high performance.

Advantages of embodiments of the present disclosure, as will be shown below, may include, but is not limited to, an event repository which provides a more rapid creation and publication of an event by virtue of the database retrieving the event from an event repository compared to normal event creation. Another advantage is that by virtue of the event repository enabled to logically organize events, e.g., by type, shape and/or duration, similar types of events are more readily retrieved. Yet another advantage is that the volume of events that are stored can be autonomously adapted depending upon the load of the system in which embodiments of the present disclosure are implemented. Still another advantage is that the event repository can automatically remove those events experiencing minimal requests for publishing and/or remove those events receiving fewer requests during periods of high volume event throughput. Another advantage is that the event repository can reduce processor usage, memory usage and bandwidth usage consumed by the database during high volume throughput. An additional advantage is that by virtue of storing an event in and retrieving an event from an event repository, fragmentation and wasted memory are reduced, thereby increasing the available space for additional usage.

BRIEF DESCRIPTION OF THE DRAWINGS

The accompanying drawings, which are incorporated in and form a part of this specification, illustrate embodiments of the disclosure and, together with the description, serve to explain the principles of the disclosure.

DETAILED DESCRIPTION OF THE DISCLOSURE

Embodiments for a high-performance scalable, adaptive multi-dimensional event repository are described. Reference will now be made in detail to the preferred embodiments of the present disclosure, examples of which are illustrated in the accompanying drawings. While the disclosure will be described in conjunction with the preferred embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure.

Embodiments of the present disclosure are discussed primarily in the context of a database application having a messaging or "event notification" system operable therewith. However, it is noted that embodiments of the present disclosure can be utilized by other software applications having database-like functionalities that may be configured to utilize a messaging system including, but not limited to, a database application.

Figure 1:
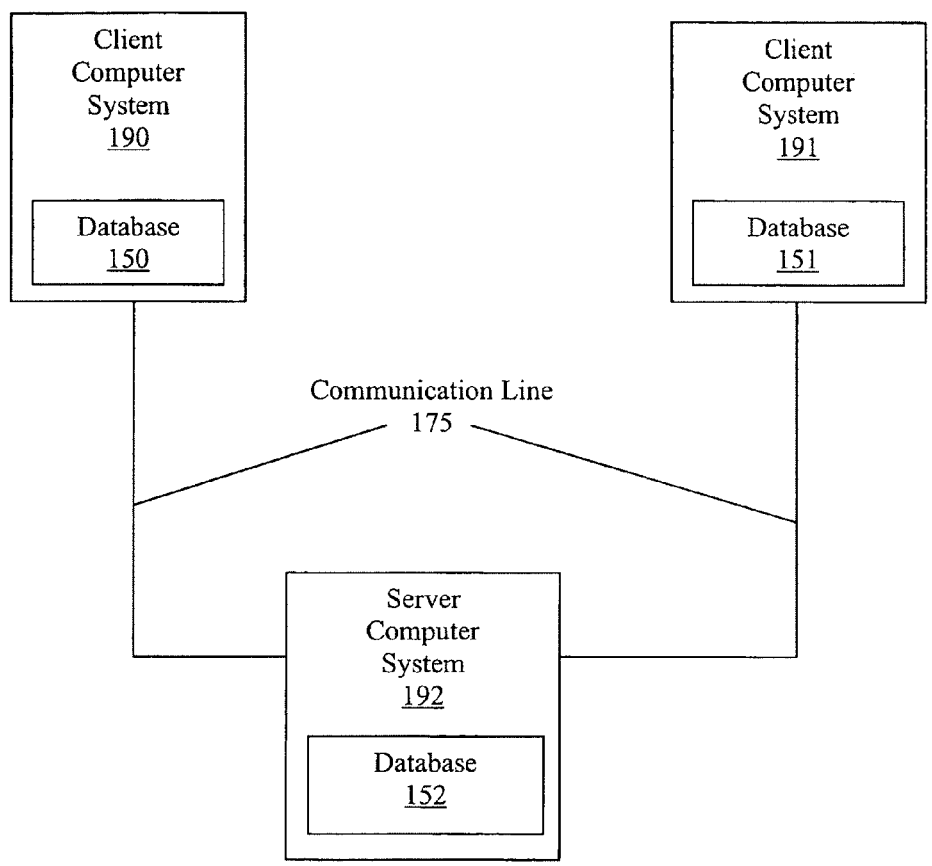
FIG. 1 is a block diagram of an exemplary network environment in which embodiments of the present disclosure may be practiced, in accordance with embodiments of the present disclosure.

FIG. 1 is a block diagram illustrating an exemplary client-server computer system network, e.g., network 100, upon which embodiments of the present disclosure may be practiced. Network 100 may be a communication network located within a firewall of an organization or corporation (an "Intranet"), or network 100 may represent a portion of the World Wide Web or Internet. Client (or user) computer systems 190 and 191 and server computer system 192 are communicatively coupled via a communication line 175; the mechanisms for coupling computer systems over the Internet or over Intranets are well known in the art. This coupling can be accomplished over any network protocol, wired or wireless, that supports a network connection, such as IP (Internet Protocol), TCP (Transmission Control Protocol), UDP (User Datagram Protocol), TELNET, NetBIOS, IPX (Internet Packet Exchange), IR (infra-red), RF (radio frequency), wireless broadband, Bluetooth, LU6.2, and link layers protocols such as Ethernet, token ring, and ATM (Asynchronous Transfer Mode). Alternatively, client computer systems 190 and 192 can be coupled to server computer system 191 via an input/output port (e.g., a serial port) of server computer system 191; that is, client computer systems 190 and 191 and server computer system 192 may be non-networked devices. It is appreciated that, for simplicity, only two client computer systems and a single server computer system are shown; however, it is understood that network 100 may comprise any number of client computer systems and server computer systems.

Still referring to FIG. 1, shown in client computer system 190 is a database 150, shown in client computer system 191 is a database 151 and shown in server computer system 192 is a database 152, in an embodiment of the present disclosure. In accordance with embodiments of the present disclosure, database 150 may be different from database 151 and database 152 and database 151 may be different from database 152. It is noted that in another embodiment of the present disclosure, databases 150, 151 and 152 may be analogous. In an alternative embodiment, server computer system 192 may have a database 150, 151 or 152 and client computer systems 190 and 191 may not include a database 150, 151 or 152, such that client computer systems 190 or 191 may access a database remotely.

In an embodiment of the present disclosure, database 150 of client system 190 may be a source database, e.g., the database where changes are generated, and database 151 of client computer system 191 may be a destination database, the database where events are consumed. Further, database 152 of server computer system 192 may be an intermediate database, through which events being propagated are routed from the source database 150 to the destination database 151. Alternatively, database 152 in server computer system 192 may be the source database and databases 150 and 151 of client computer systems 190 and 191, respectively, may both be destination databases. In yet another scenario, database 152 of server computer system 192 may be a source database, database 150 of client computer system 190 may be an intermediate database and database 151 of client computer system 191 may be a destination database. It is noted that depending on the flow of data, each database 150, 151 and 152 can be a source database, an intermediate database, and/or a source database. It is also noted that each database 150, 151 and 152 can be both a source database and a destination database.

Figure 2:
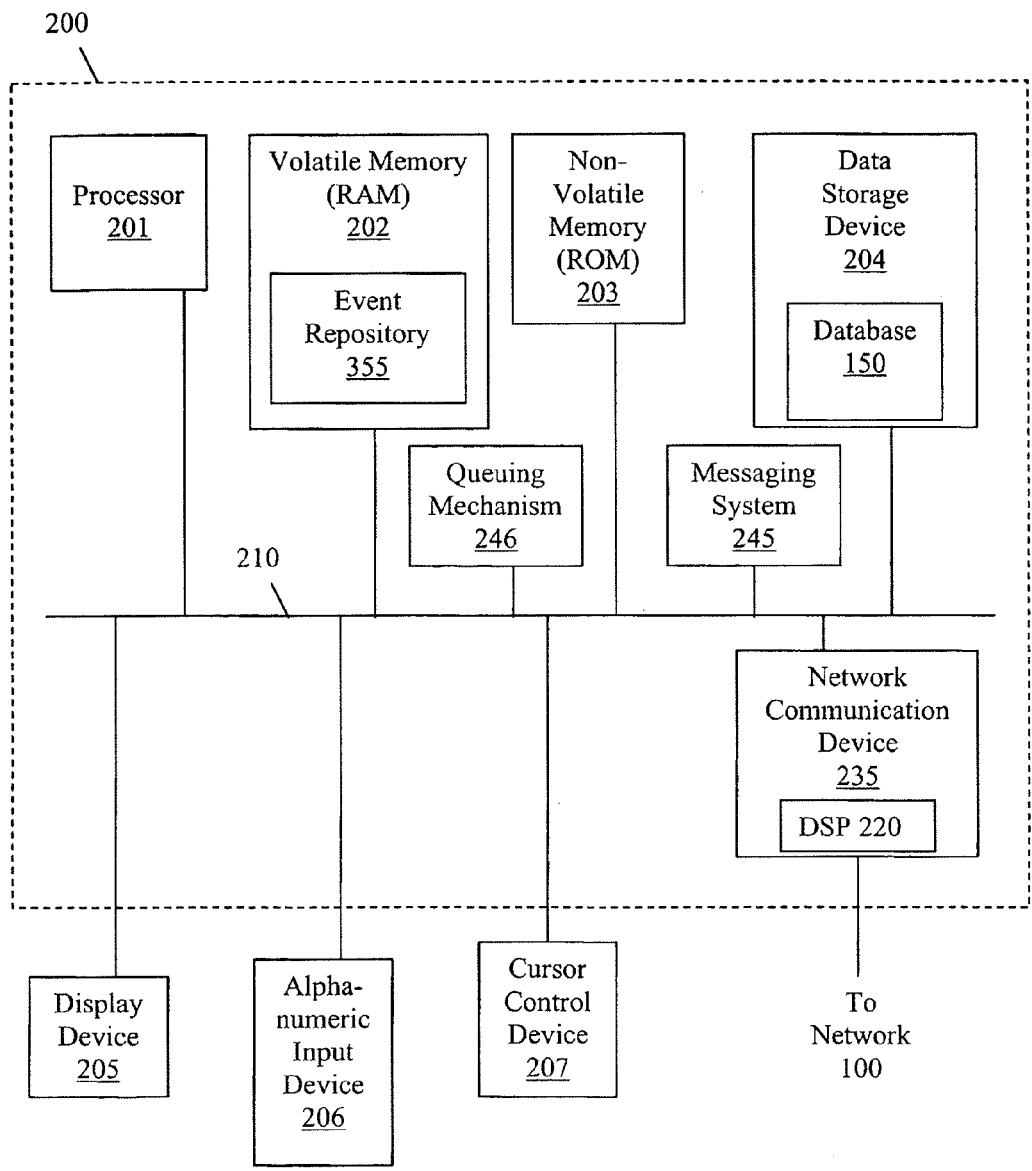
FIG. 2 is a block diagram of a computer system in which embodiments of the present disclosure may be practiced, in accordance with embodiments of the present disclosure.

FIG. 2 is a block diagram illustrating components and circuitry of an exemplary computer system 200, which can be implemented within a client computer system, e.g., client computer system 190 and/or 191, and in a server computer system, e.g., server computer system 192, of FIG. 1, upon which embodiments of the present disclosure may be practiced. Computer system 200 includes an address/data bus 210 for communicating information, a central processor 201 coupled with the bus for processing information and instructions, a volatile memory 202 (e.g., random access memory, RAM) coupled with the bus 210 for storing information and instructions for the central processor 201 and a non-volatile memory 203 (e.g., read only memory, ROM) coupled with the bus 210 for storing static information and instructions for the processor 201. Optionally, computer system 200 can include dynamic ROM (DROM, not shown). It is noted that in an embodiment, computer system 200 can be configured with a plurality of processors 201. It is also noted that in an embodiment of the present disclosure, volatile memory 202 may have allocated therewithin an event repository 350 in accordance with embodiments of the present disclosure.

Computer system 200 of FIG. 2 also includes a data storage device 204 coupled with bus 210 for storing information and instructions, e.g., database 150, 151 or 152. Data storage device 204 can be, for example, an HDD (hard disk drive), an FDD (floppy disk drive), a compact memory device, a CD-RW (compact disk with write functionality), a DVD-RW or DVD+RW (digital versatile disk with + or − write functionality), a dual layer DVD, a tape drive, etc., and furthermore device 204 can be in multiples or in a combination thereof. Data storage device 204 may also be plurally instanced, removable, and/or hot swappable (connected or unconnected while computer system is powered).

With reference still to FIG. 2, computer system 200 also includes a network communication device 235, which is coupled to bus 210 for providing a communication link between computer system 200, and a network environment, e.g., network environment 100 of FIG. 1. As such, network communication device 235 enables central processor unit 201 to communicate with other electronic systems coupled to the network, e.g., network 100 of FIG. 1. It should be appreciated that the present embodiment of network communication device 235 is well suited to be implemented in a wide variety of ways. In one example, network communication device 235 is coupled to an antenna and provides the functionality to transmit and receive information over a wireless communication interface, e.g., Bluetooth, IR (infra-red), RF (radio frequency), satellite and the like. In another example, network communication device 235 could be implemented as a modem, wired or wireless. In yet another example, network communication device 235 could be configured as a NIC (network interface card), wired or wireless.

Still referring to FIG. 2, network communication device 235, in an embodiment, includes an optional digital signal processor (DSP) 220 for processing data to be transmitted or data that are received via network communication device 235. Alternatively, processor 201 can perform some or all of the functions performed by DSP 220.

Also included in computer system 200 of FIG. 2 is an optional alphanumeric input device 206. In an implementation, device 206 is a keyboard. Device 206 can be physically coupled to computer system 200. Alternatively, device 206 may be wirelessly coupled to computer system 200. Alphanumeric input device 206 can communicate information and command selections to processor 201.

Computer system 200 of FIG. 2 also includes an optional cursor control or directing device (on-screen cursor control) 207 coupled to bus 210 for communicating user input information and command selections to processor 201. In another common implementation, on-screen cursor control device 207 is a mouse or similar pointing device.

Computer system 200 also contains a display device 205 coupled to the bus 210 for displaying information to the computer user.

Still referring to FIG. 2, shown coupled to bus 210 are a messaging system 245 and a queuing mechanism 246. Messaging system 245 looks at changes to data accumulating in redo files located in a redo log (redo log 351 of FIGS. 3, 4 and 5 and/or redo log 361 of FIG. 4), examines the redo files and publishes the database changes as events in a queue (queue 160 of FIGS. 3, 4 and 5 and/or queue 161 of FIG. 4). In accordance with embodiments of the present disclosure, it is noted that messaging system 245 is enabled to logically organize event templates within event repository 355 (as described in FIG. 6) according to, or in a combination of and which is not limited to, event type, event shape and event duration. Logically organizing the event templates enables messaging system 245 to, but is not limited to, rapidly retrieve events of similar type, shape and/or duration. Messaging system 245 is also enabled to intercept requests to publish an event, in accordance with embodiments of the present disclosure. Additionally, messaging system 245 can determine the optimal location in event repository 355 where an event template is to be stored. For example, stock quotes events would be stored with other stock quotes event templates, football results events would be stored with other football results event templates, commodity futures events would be stored with other commodity futures event templates, and so on, as shown in FIG. 6. Alternatively, events having a particular duration, e.g., one week, may be stored with other events having analogous durations or events having a particular shape may be stored with other events having analogous shapes, and so on.

In an embodiment of the present disclosure, Oracle Streams, by Oracle® International Corporation of Redwood City, Calif., USA, may be used as messaging system 245. It is noted that embodiments of the present disclosure are well suited to be implemented in conjunction with other messaging systems including, but not limited to, Oracle Streams.

Queuing mechanism 246, commonly, but not always a product separate from the database and/or the messaging system, allows for publishing and subscribing of an event. The queuing mechanism further allows different users to publish different events to a queue and subscribers can express their interest in those events. In an embodiment of the present disclosure, a queuing mechanism may be, but is not limited to, Oracle Streams Advanced Queuing by Oracle® International Corporation of Redwood City, Calif., USA. It is noted that embodiments of the present disclosure are well suited for implementation in conjunction with other queuing mechanisms including, but not limited to, Oracle Streams Advanced Queuing.

Figure 3:
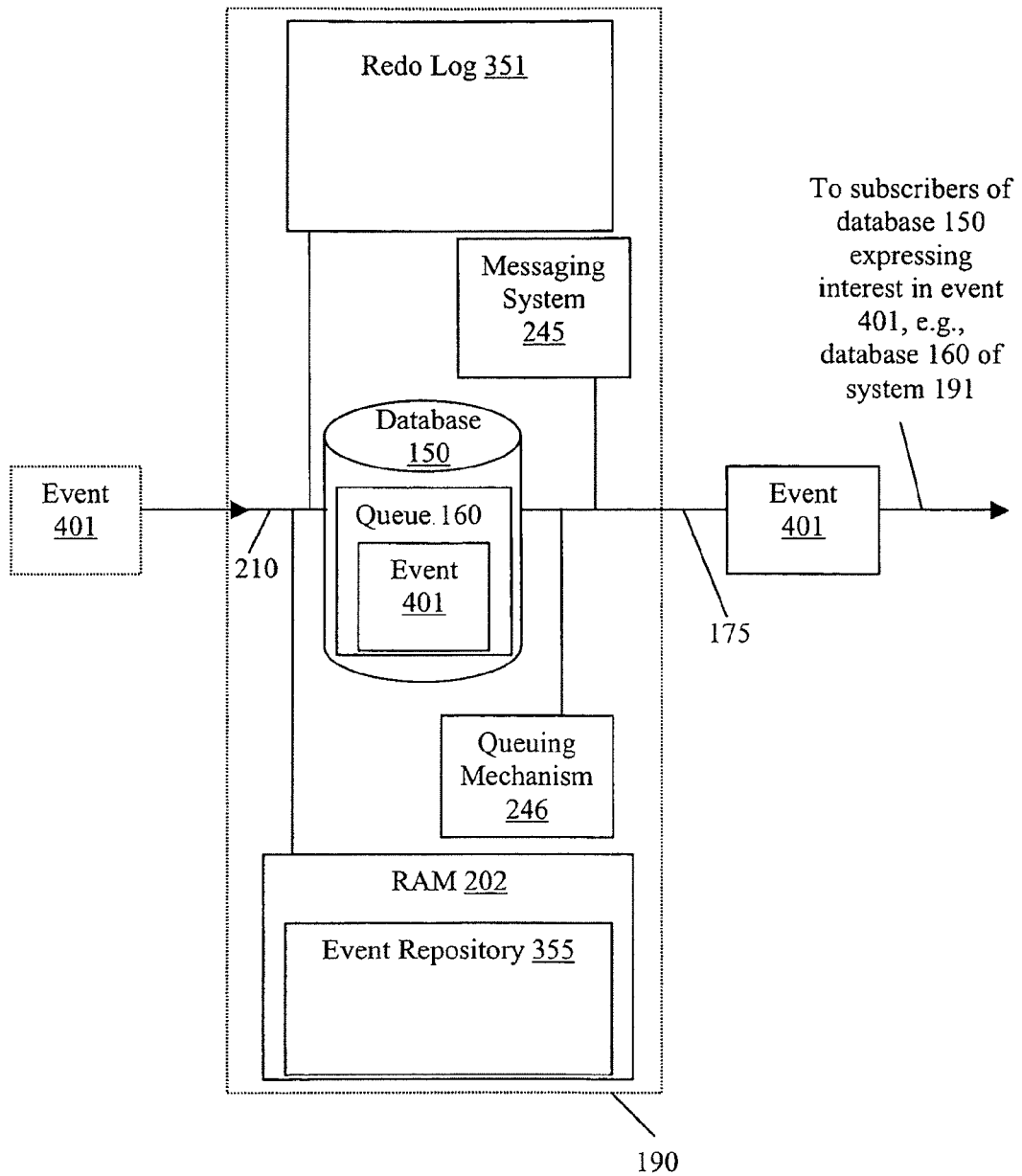
FIG. 3 is a block diagram illustrating a database in which an event is received, formatted, queued and propagated, in accordance with embodiments of the present disclosure.
Figure 4:
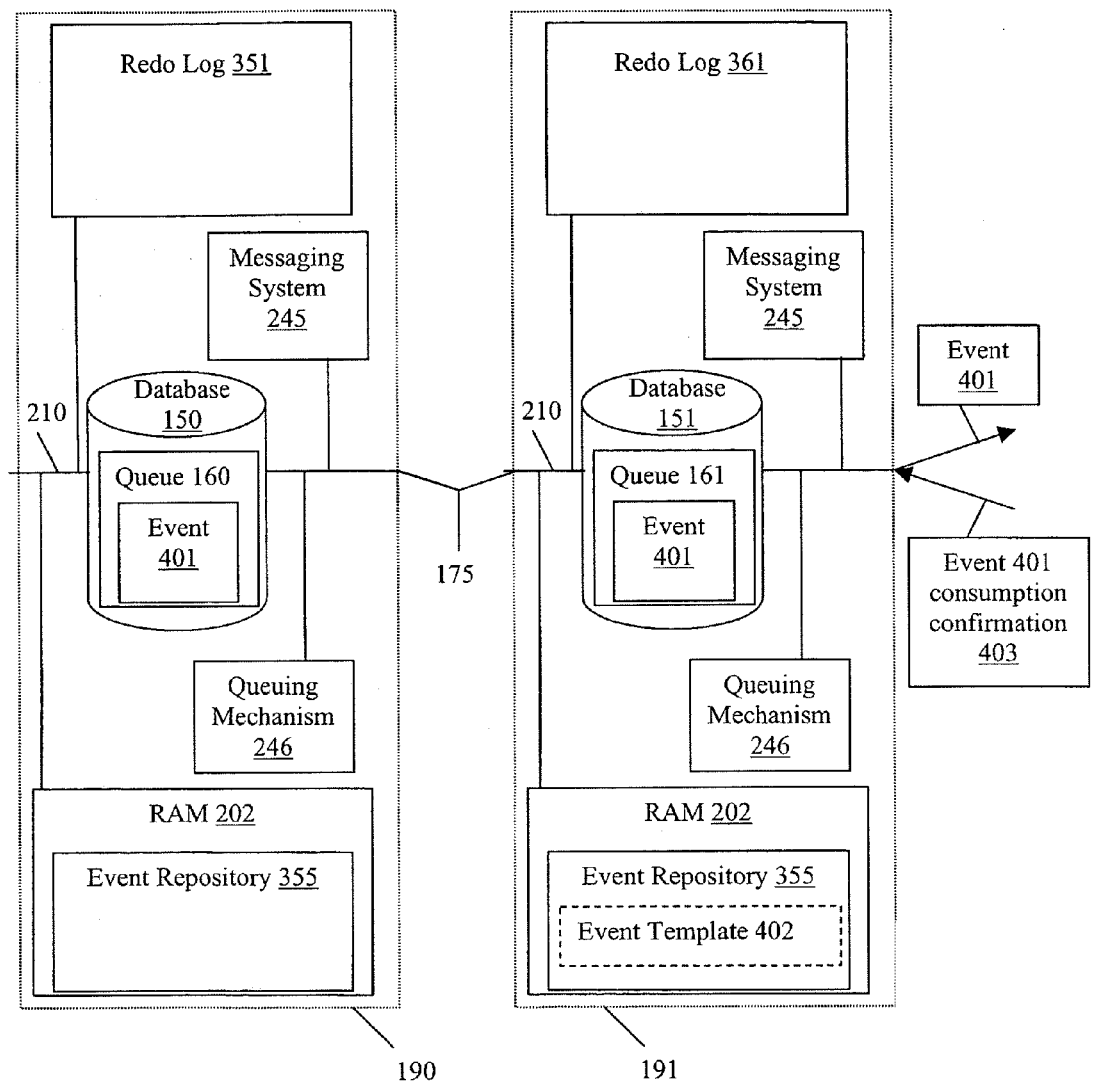
FIG. 4 is a block diagram illustrating the processes performed subsequent to the event propagation as described in FIG. 3, in accordance with embodiments of the present disclosure.
Figure 5:
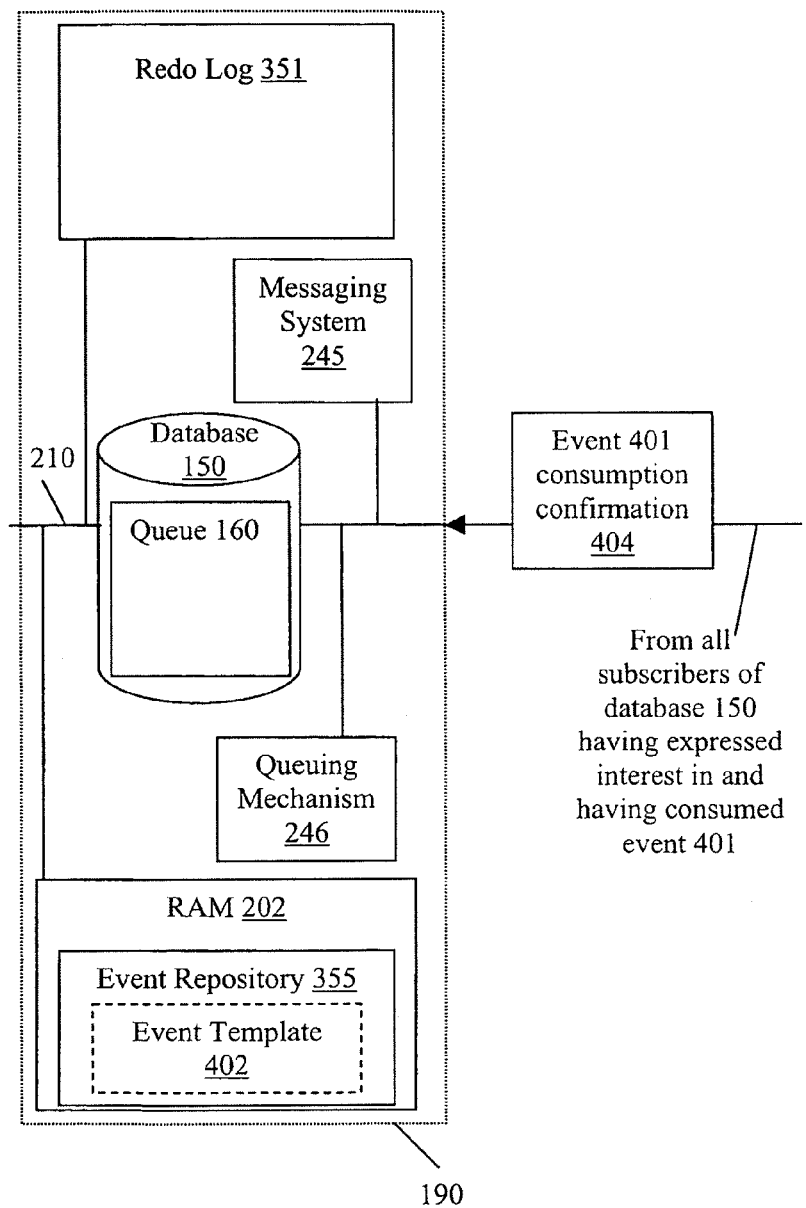
FIG. 5 is a block diagram depicting processes applied to an event subsequent to the consumption of the event as described in FIG. 4, in accordance with embodiments of the present disclosure.
Figure 6:
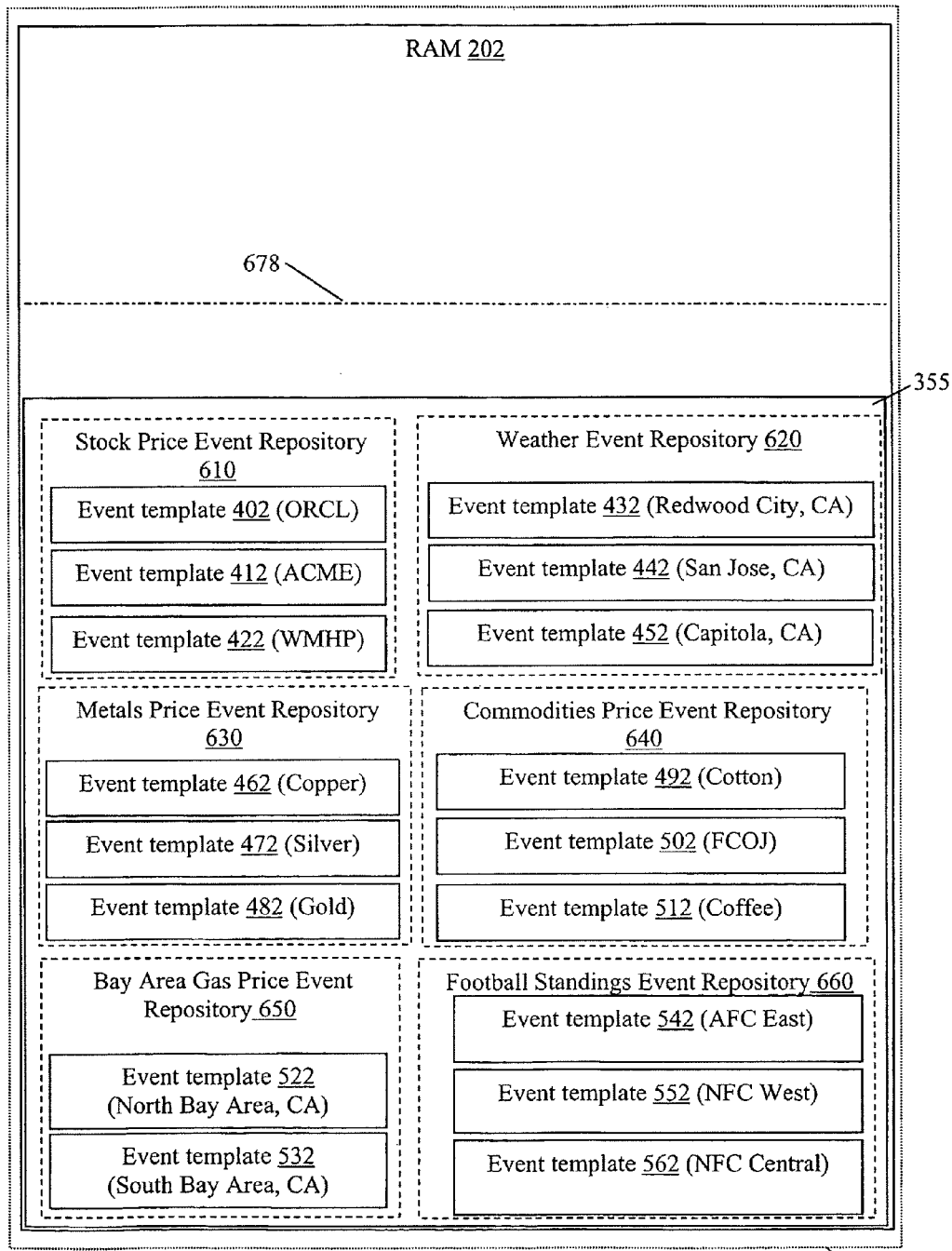
FIG. 6 is a block diagram of various templates of events stored in event repository, in accordance with embodiments of the present disclosure.

Referring collectively to FIGS. 3, 4 and 5, shown are functionalities provided by and processes performed in conjunction with embodiments of the present disclosure. With reference to FIG. 3, shown is a client computer system 190, analogous to client computer system 190 of FIG. 1. Coupled to client computer system 190 is a database 150. It is noted that database 150 may reside within client computer system 190. In an alternative embodiment, database 150 may be externally disposed and coupled to client computer system 190. Upon activating a database, e.g., database 150, messaging system 245, operable in conjunction with database 150, allocates a portion of RAM (volatile memory 202 of FIG. 2) in client computer system 190 for utilization as an event repository, e.g., event repository 355 of FIGS. 3, 4, 5 and 6, in an embodiment of the present disclosure.

In accordance with embodiments of the present disclosure, for each database 150 that is activated, an associated event repository 355 is locally created by messaging system 245 and is operable in conjunction with the local database 150. In an embodiment of the present disclosure, event repository 355 can be located entirely within volatile memory 202 of client computer system 190 in which database 150 is operable. Alternatively, event repository 355 may be combinationally disposed in volatile memory 202 of client computer system 190 and in a file swap function (utilization of hard disk space as RAM, not shown) provided by the operating system in client computer system 190. When utilized in a file swap function, event repository 355 may be disposed, in part, in a data storage device e.g., data storage device 204 in addition to volatile memory (RAM) 202 of client computer system 190, in an embodiment of the present disclosure.

In an embodiment of the present disclosure, event repository 355 is configured to store therewithin one or more event templates in which each event template may or may not represent a different event. An event template is a template of an event which enables messaging system 245 to reconstruct the event. An event may be reconstructed from the associated event template when all subscribers that expressed an interest in that particular event have consumed the event and the event is therefore removed from an event queue and placed in an event repository, in accordance with embodiments of the present disclosure. In other words, once an event has run its course in the messaging system, rather than being destroyed, it is deposited into the event repository where its use as a template for other events is used to make event publication more efficient.

In an embodiment of the present disclosure, event repository 355 retains each event template as an event structure. An event structure contains necessary information regarding the event so that messaging system 245 can reconstruct the event in accordance with a publisher's criteria relative to that event. An event structure can include, but is not limited to, type of event, shape of the event, size of the event and duration of the event. Examples of types of events include, but is not limited to, stock price quotes events, commodities price events, airline schedules events, sports scores events and/or standing events, fuel prices events, and so on. It is noted that nearly anything that can have a value can be a type of event. The shape of the event can be simple or complex, e.g., one event (simple) or multiple sub-events within sub-events within the event (complex). Size of the event can include, but is not limited to, e.g., in a stock quote, the stock symbol (four digits), current price (six digits), previous high and/or low (six digits) and so on. Accordingly, the size of a stock quote event that includes ticker symbol, current price, previous high and previous low could have a size of twenty-two bits. Using a stock price, the duration may be for five minutes, ten minutes or any period of time, depending upon a publishers and/or subscribers desires. Sports scores (e.g., football scores) and standings events may have a one-week duration. Airline schedules events may have a three-month duration. It is noted that any event can be of any type, can have any shape, can have any size and can have any duration. The event structure is predicated upon the publisher's intent and the subscriber's desire relative to the publisher's intent.

An event can be an explicit event in which a publisher/subscriber can place messages and/or events into a queue, e.g., queue 160. The same publisher/subscriber can perform work on the message or event from the local database, e.g., database 150, or across multiple databases, e.g., database 151 and/or database 152. An explicit event can also be utilized for information integration where it is desired to have one database communicate with another differing database. Additionally, an explicit event can allow a publisher/subscriber to perform work on a message or an event in which other associated parties are not required to be active at the time the publisher/subscriber is performing their work.

An event can also be an implicit event in which a publisher/subscribe performs a modification of data, e.g., an update or a database table operation. In an embodiment of the present disclosure, messaging system 245 can capture the modification, transform the modification into an event, and place the transformed modification into a queue.

For example, a request to publish a new event, e.g., event 401, is received by database 150 operable in client computer system 190 via a communicative coupling, e.g., communication line 175 and/or via bus 210. It is noted that the request to publish event 401 may be generated local to database 150 or remote to database 150. In the present example, event 401 is a stock quote event for Oracle International Corporation that contains the ticker symbol (ORCL), the current price, the previous high and the previous low stock price.

In accordance with embodiments of the present disclosure, when a request to publish a new event, e.g., event 401, is received by database 150, messaging system 245 intercepts the request, and examines event repository 355 for a match with a stored event therein. When a match to event 401 is found in event repository 355 (FIG. 5), messaging system 245 reconstructs the new event from the matching event in event repository 355. By using an existing template, e.g., event template 402, rather that creating the new event from scratch, the event generation process is made much faster.

Continuing, upon messaging system 245 reconstructing event 401 from the matching event stored in event repository 355, the publisher who requested the publishing of a new event similar to event 401 is then able to marshal the event, such that pertinent values for the new event are updated. Subsequent to marshaling, the event, e.g., event 401, is then placed in event queue 160 of database 150.

When no match is found for event 401 (FIG. 3), the event 401 is created afresh in memory, e.g., RAM 202. It is noted that data and/or events may be changed or formatted by a predetermined set of rules before an event is packaged into a logical change record (LCR). Event 401, now packaged into an LCR, is then placed in a queue, e.g., queue 160, in accordance with embodiments of the present disclosure. LCR's, e.g., event 401, is/are stored in queue 160 until a subscriber expressing interest in event 401 obtains event 401 for use by, or to be consumed by, the subscriber. It is noted that when a subscriber of database 150 that expressed interest in event 401 consumes event 401, event 401 remains in queue 160 until all subscribers expressing an interest in event 401 have consumed event 401.

In accordance with embodiments of the present disclosure, a subscriber can be, but is not limited to, a user, another staging environment, an application process, an apply process, in which the subscriber can subscribe to any or all events. Regarding an apply process, an apply process dequeues all those events coming into the queue, removing it from the queue. An apply process is commonly, but not always, utilized for database changes. However, an apply process can also be used to handle other messages as well.

The subscriber/user can also utilize rules to define those events that are desired and those events that are not desired. Additionally, a subscriber/user may be locally coupled to the database or a subscriber/user may be remotely coupled to the database, enabling remote access to the database. In addition, a queuing mechanism, e.g., queuing mechanism 246, operable in conjunction with database 150 allows communication to be asynchronous, meaning that it is not necessary for the other database to be running when attempting to communicate. Further, a subscriber/user can consume the event from another queue located in an alternative database. In many instances, messaging system 245 can propagate the message/event to whichever database the subscriber/user is located.

In accordance with embodiments of the present disclosure, a publisher can be, but is not limited to, an application process or a user.

Currently, events are classified as an explicit event or an implicit event. An explicit event is where an end user (publisher/subscriber) can place messages and events into a queue. The same publisher/subscriber (end user) can do work across databases. Explicit events are used for information integration, where it is desired to have one application in communication with another application. An implicit event is where an event is captured by changes made to a database. The end user is not en-queuing some data into the queue, the end user is actually modifying data, e.g., a data update or a database table operation. Implicit events are implicitly captured, transformed into an event and put into the queue.

Within events, there are currently two messaging types, persistent and non-persistent messaging. In persistent messaging, when a user places an event in a persistent queue, it is persistent (saved in a non-volatile manner) on the disk. In this manner, even when the event is placed into the queue, the event will not be lost upon a network, system or database crash. Persistent messaging is utilized for, but not limited to, critical data, for data that is not easily retrieved, because there may not be anyway to reconstruct the events into the queue and for explicit events. In non-persistent messaging, the events are stored in a non-persistent queue that may be located in volatile memory, e.g., RAM, such that in the event of a crash, the event is lost. Database changes are written to a redo log file. Because the redo log is persistent, when a network, computer or database crashes, the event is recoverable from another source of persistency and the lost event is re-en-queued into the queue. Non-persistent messaging is commonly utilized for, but is not limited to, non-critical data, easily retrieved events and implicit events. It is noted that explicit events may be placed in a non-persistent message and implicit messages may be placed in a persistent message.

Subsequent to event 401 being formatted and placed into queue 160, messaging system 245 and/or queuing mechanism 246 propagates event 401 to all subscribers expressing interest in a stock quote event, e.g., event 401. Event 401 may be propagated via bus 210, via communication connection 175 or a combination thereof. Messaging system 245 is enabled to dictate the manner in which event 401 is propagated and to whom (subscribers) event 401 is to be propagated, in an embodiment of the present disclosure. A publisher associated with database 150 marshals event 401, e.g., applies changes to event 401. Subsequently, messaging system 245 or queuing mechanism 246, or a combination thereof, then readies event 401 for propagation to all the subscribers of the database that have expressed an interest in the event, e.g., event 401.

Continuing, and with reference to FIG. 4, database 150 of computer system 190 has initiated messaging system 245 operable therein to propagate event 401 to all the subscribers who have expressed interest in event 401. In this implementation, client computer system 191 which has operable therein database 151, is the destination database and to which a plurality of subscribers have expressed an interest in event 401.

In accordance with embodiments of the present disclosure, event 401, having been propagated to database 151 from database 150, is then copied by messaging system 245 of database 151, and placed in queue 161 of client computer system 191, shown as event 401. In an embodiment of the present disclosure, messaging system 245 causes propagation of event 401 to those subscribers of database 151 expressing an interest in event 401. Alternatively, queuing mechanism 246, similar to queuing mechanism 246 as described in FIG. 3, propagates the event to subscribers of database 151 having expressed an interest in event 401. As such, event 401 is placed in a queue 161 of database 151 for such propagation.

Subsequent to event 401 being queued, all the subscribers of database 151 that expressed an interest in event 401 are then able to consume the event, in a manner dictated by the subscriber. When a subscriber of database 151 consumes event 401, the event is de-queued for that subscriber. It is particularly noted that all remaining subscribers, having expressed an interest in event 401, but have yet to consume the event, are still able to access event 401 in queue 161. It is also particularly noted that until all the subscribers that expressed an interest in event 401 have consumed event 401, or if the duration of event 401 has yet to expire, event 401 remains in queue 161 of database 151 of client computer system 191. In accordance with embodiments of the present disclosure, it is noted that event 401 also remains in queue 160 of database 150.

Referring still to FIG. 4, upon all subscribers to database 151 that expressed an interest in event 401 having consumed event 401, event 401 is de-queued from queue 161. Alternatively, if event 401 has expired (in accordance with its duration), event 401 is set to expired status in queue 161. Event 401 is removed from queue 161 and a template of event 401 is placed in event repository 365, shown as event template 402, in accordance with embodiments of the present disclosure. Once messaging system 245 has determined that all subscribers to database 151 that expressed an interest in event 401 have consumed event 401, or event 401 has expired, messaging system 245 operable in conjunction with database 151 messages database 151 indicating that all subscribers to event 401 have consumed event 401, shown as event 401 consumption confirmation 403. In accordance with embodiments of the present disclosure, upon receipt of confirmation 403, messaging system 245 places a template of event 401, shown as event template 402 in event repository 365. Once the messaging system has placed event template 402 in event repository 365, messaging system 245 operable in conjunction with database 151 messages messaging system 245 operable in conjunction with database 150 of computer system 190 indicating that all subscribers to database 151 expressing an interest in event 401 have consumed event 401, shown as event 401 consumption confirmation message 404 of FIG. 5, in accordance with embodiments of the present disclosure.

Referring to FIG. 5, upon receiving an event consumption confirmation message, e.g., message 404, from those databases coupled to database 150 and/or from those subscribers expressing an interest in event 401, or event 401 has expired, messaging system 245 operable in conjunction with database 150 de-queues event 401 from queue 160, in accordance with embodiments of the present disclosure. Instead of destroying event 401, messaging system 245 creates a template of event 401, shown as event template 402, analogous to event template 402 of FIG. 4, in accordance with embodiments of the present disclosure.

In accordance with embodiments of the present disclosure, when a re-request to publish event 401, messaging system 245 operable in conjunction with database 150 intercepts the request and examines event repository 355 for the template associated with event 401, e.g., event template 402. If the template associated with event 401 is located in event repository 355, messaging system 245 reconstructs event 401 from its associated template, e.g. event template 402, reconstructs the event, the publisher of the event marshals the event, messaging system 245 in conjunction with queuing mechanism 246 propagates the newly re-requested to publish event to all subscribers to database 150 that expressed an interest in event 401.

Alternatively, if the template associated with event 401, e.g., event template 402 is not found in event repository 355, messaging system 245 causes database 150 to create event 401.

It is particularly noted that an event that is reconstructed, via the messaging system and event repository, consumes substantially less time and fewer system resources than it takes for an event to be created in response to a request to publish an event.

FIG. 6 is a block diagram of an exemplary event repository, e.g., event repository 355 of FIGS. 2, 3, 4 and 5 and/or event repository 365 of FIGS. 3 and 4, in accordance with embodiments of the present disclosure. It is noted that although each event repository is created in conjunction with the associated local database, e.g., event repository 355 and database 150 or event repository 365 and database 160, each event repository is comprised of analogous functionalities.

FIG. 6 includes volatile memory 202 of computer system 200 in which event repository 355 is created by messaging system 245, in accordance with embodiments of the present disclosure. Event repository 355 includes a threshold level, e.g., threshold level 678. Threshold level 678 is a defined parameter for limiting the volume of event templates that may be stored in event repository 355, in accordance with embodiments of the present disclosure. In an embodiment of the present disclosure, threshold level 678 may be one value for one database, e.g., seventy percent of available RAM 202 coupled with database 150, and a different value for another database, e.g., sixty percent of available RAM 202 coupled to database 160. It is noted that threshold level 678 may be any portion of available RAM 202 coupled to a database.

SCALABILITY

It is particularly noted that the number of templates of events that may be stored in an event repository, e.g., event repository 355, may increase or decrease dependent upon, in part and is not limited to, event throughput, number of subscribers, number of publishers, and so on. An objective of the present disclosure is to provide an event repository with which rapid publication of an event can be achieved, regardless of the number of events or associated templates stored within an event repository. In accordance with embodiments of the present disclosure, an indexing mechanism (not shown) operable with messaging system 245 has been configured to provide a constant event creation when requested by messaging system 245 and a constant event destroy requested by messaging system 245 when all subscribers expressing an interest in an event have consumed the event.

ADAPTABILITY

It is particularly noted that threshold level 678 may be increased or decreased in accordance with system requirements and event traffic throughput, and as such; event repository 355 is scalable. Thus, when an alternative application or other computing entity requires system RAM, of which some may be utilized for allocation for event repository 355, embodiments of the present disclosure provide a mechanism for adjusting threshold level 678 when RAM used in the allocation of an event repository is required for alternative purposes. Therefore, in accordance with embodiments of the present disclosure, an application programming interface (API) can be invoked (called) to perform the adjustment of the threshold level 678. In an embodiment, the API can calculate for a period of time, e.g., five minutes, fifteen minutes, etc., the traffic for various types of events in which the events may have differing dimensions. The API can determine how many requests for this event and how many requests for that type of event, and the API can cause an event destroy for those events less requested and can ensure readily retrievable events for those events that receive elevated numbers of requests for publication. It is noted that various well known techniques can be utilized to invoke the API. Alternatively, other mechanisms providing similar functionality may be employed as an alternative to an API.

MULTI-DIMENSIONALITY

Shown within event repository 355 are examples of event repository types in which are stored corresponding event templates. In an embodiment of the present disclosure, types of events can be grouped using criteria. Examples of criteria for grouping types of events may include its shape (type of data) which may include, but is not limited to, a string, number(s) or data. Criteria related to size of the event and related to the duration of an event may also be utilized in determining the grouping of the event. Events within the event repository may be stored predicated on the criteria, type of data, size, and duration. Alternatively, other criteria may be implemented for grouping of events with an event repository. In an embodiment, an event may be hashed to provide a matching reference from which a subsequent event may be reconstructed.

Within each event repository type shown in FIG. 6, there are disposed one or more associated event templates. In stock price event repository 610, shown are event templates for a stock price for Oracle, Acme, and WMHP. Weather event repository 620 includes event templates for Redwood City, San Jose and Capitola. Metals price event repository 630 includes event templates for Copper, Silver and Gold. Commodities price event repository 640 includes event templates for Cotton, Frozen Concentrate Orange Juice and Coffee. Bay area gas price event repository 650 includes event templates for North Bay Area and South Bay Area. Football standings event repository 660 includes event templates for AFC East, NFC West and NFC Central. It is noted that event repository 355 may contain a greater number of event repository types or a fewer number of event repository types. It is noted that each event repository type may contain more event templates or fewer event templates. It is further noted that the event repository types and event templates shown in FIG. 6 are exemplary in nature and should not to be construed as a limitation.

Shown in stock price event repository 610 is an event template 402 for the stock price of Oracle International Corporation, an event template 412 for stock price of Acme Manufacturing and an event template 422 for the stock price of WMHP. It is noted that stock price event repository 610 may contain tens, hundreds, thousands or tens of thousands stock price events for each company that may be listed on a stock exchange, e.g., The New York Stock Exchange, The American Stock Exchange, NASDAQ, or any other stock exchange.

In accordance with embodiments of the present disclosure, messaging system 245 operable with database 150 to which event repository 355 is associated may adjust the volume of event templates in each event repository type. For example, assume that database 150 has thousands of subscribers who have expressed an interest in the stock quote for Oracle, e.g., event template 402. Further assume that database 150 has hundreds of subscribers that have expressed an interest in a stock quote for ACME manufacturing, e.g., event template 412. Additionally assume that tens of subscribers have expressed an interest in a stock quote for WHMP, event template 422. In an embodiment of the present disclosure, messaging system 245 is able to remove from stock price event repository 610, or other stock price event repositories, those stock price event templates that are requested less frequently that other stock price event templates. In this example, event template 422 (WMHP) has been requested less frequently that event template 402 or 412. In accordance with embodiments of the present disclosure, messaging system 245 may remove event template 422 (WHMP) from stock price event repository 610. It is noted that messaging system 245 may increase or decrease the volume of event templates in any event repository type in accordance with available allocated RAM 202 and with system requirements of the computer system in which database 150 is operable, e.g., computer system 200. Messaging system 245 may also adjust the volume of event templates in accordance with constraints pertaining to and the associated transactional traffic of a database, e.g., database 150.

In accordance with embodiments of the present disclosure, messaging system 245 is further enabled to remove an event repository type when messaging system 245 determines that a particular event repository type when the event templates, stored therein, are requested less frequently than other event templates in other event repository types. For example, assume that tens of thousands of subscribers have expressed an interest in various daily stock prices, e.g., those event templates within stock price event repository 610, e.g., event templates 402, 412 and 422. Further assume that a few hundred subscribers have expressed interest in a weekly football standings event, e.g., those event templates within football standings event repository 660. In accordance with embodiments of the present disclosure, when the volume of event repository types stored in event repository 355 reaches threshold 678, messaging system 245 may remove football standings event repository 660. Alternatively, messaging system 245 may remove particular event templates that are requested less frequently that other event templates, e.g., removing event template 562 when requests for NFC Central standings (event template 562) are less frequent that other event templates, e.g., event templates 542 and 552.

Thus, as described above, embodiments of the present disclosure provide for a multi-dimensional event repository in which various events having different dimensions, e.g., type, shape (size) or duration, may be stored in a logical manner. For example, and as described above, like events such as stock price quotes, football scores, and the like may be stored together. Additionally, events of a similar shape or size, e.g., football scores, baseball scores, hockey scores, etc., may be stored together in an event repository. Further, events of a similar duration may also be stored together, e.g., events with a duration of minutes stored with other events with a duration of minutes, events with a duration of days stored with other events with a duration of days, and so on. Accordingly, embodiments of the present disclosure provide an event repository in which events having differing dimensions can be logically stored, expediting publishing of an event.

It is noted that as messaging system 245 removes event repository types and/or event templates, the space within event repository 355 consumed by the removed repository types or event templates is returned to available space within the allocated portion of RAM 202 in which event repository 355 is disposed.

Additionally, the messaging system may also adjust the number of event templates in event repository 355 without regard for event repository type.

Figure 7:
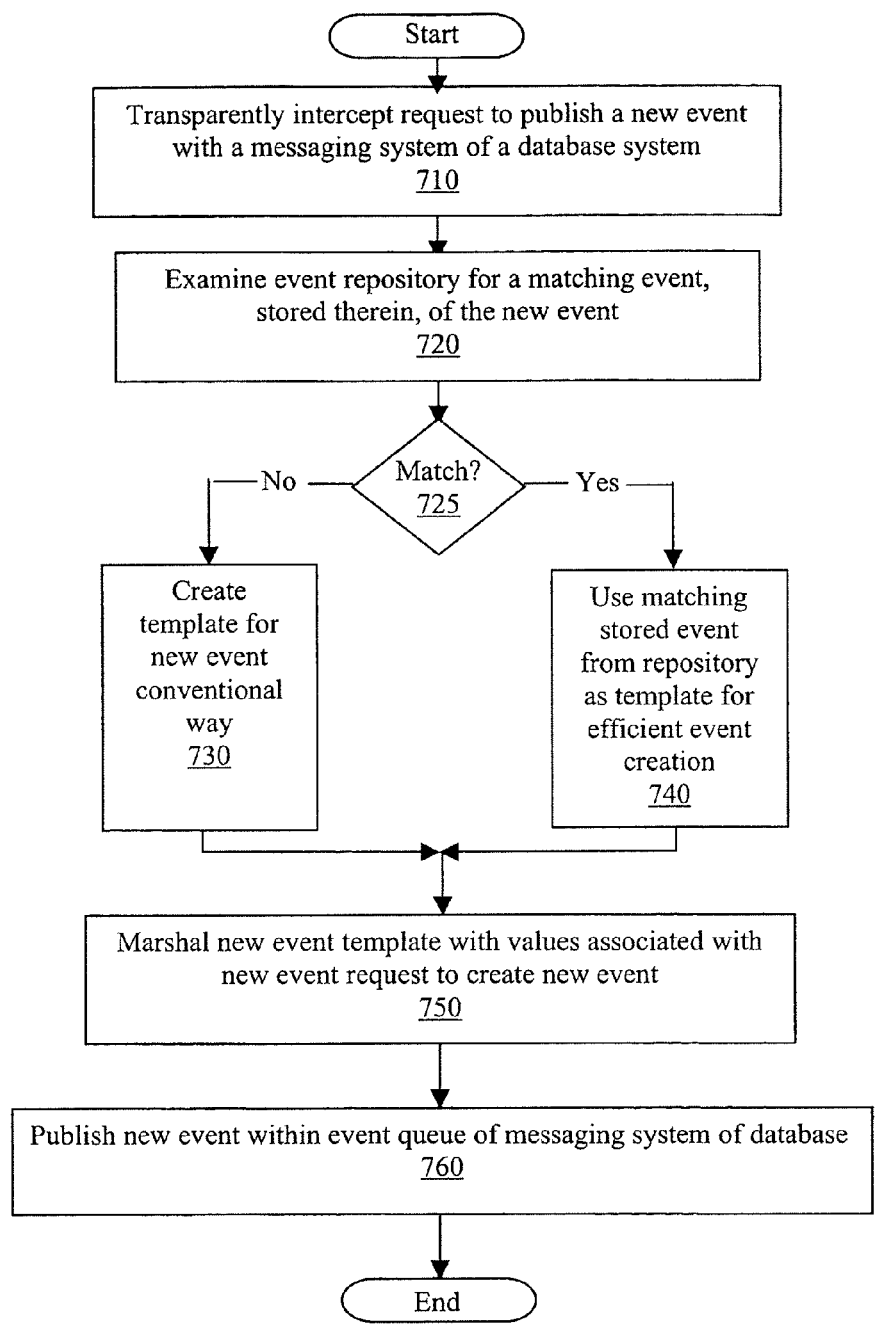
FIG. 7 is a flowchart of a process for publishing an event in a database in accordance with embodiments of the present disclosure.

FIG. 7 is a flowchart 700 of steps performed for publishing an event in a database, in accordance with embodiments of the present disclosure. Flowchart 700 includes processes of the present disclosure which, in one embodiment, are carried out by processors and electrical components under the control of computer readable and computer executable instructions. The computer readable and computer executable instructions reside, for example, in data storage features such as computer usable volatile memory 202 and/or computer usable non-volatile memory 203 and/or data storage device 204 of FIG. 2. However, the computer readable and computer executable instructions may reside in any type of computer readable medium. Although specific steps are disclosed in flowchart 700, such steps are exemplary. That is, the present disclosure is well suited to performing various other steps or variations of the steps recited in FIG. 7. Within the present embodiment, it should be appreciated that the steps of flowchart 700 may be performed by software, by firmware, by hardware or by any combination of software, firmware and hardware.

In operation 710 of process 700, a request to a database to publish an event, e.g., database 150 and event 401 of FIG. 3, database 160 and event 401 of FIG. 4, respectively, is intercepted by a messaging system, e.g., messaging system 245 (FIGS. 3 and 4), operable in conjunction with the database to whom the request is intended, in an embodiment of the present disclosure. It is noted that the request can come from a publisher local or remote to database 150.

In operation 720 of process 700, messaging system 245 examines an event repository, e.g., event repository 355 of FIGS. 3 and 4, to determine if an event matching the requested to publish event 401, e.g., event template 402, is present in event repository 355, as shown in FIG. 3 and/or FIG. 4, in accordance with embodiments of the present disclosure.

In operation 725 of process 700, if an event that matches event 401, e.g., event template 402, is not found in event repository 355, the process proceeds to operation 730. If an event that matches event 401 is found in event repository 355, process 700 proceeds to operation 740.

In operation 730 of process 700, when no match for event 401, e.g., event template 402, is found within event repository 355, embodiments of the present disclosure provide for conventionally creating a template of event 401 in accordance with functionality within database 150, as described in FIG. 3. Subsequent to completion of operation 730, process 700 proceeds to operation 750, in accordance with embodiments of the present disclosure.

In operation 740 of process 700, if the associated template for the request event, e.g., event template 402, is found in event repository 355, messaging system 245 retrieves and uses the associated template, e.g., event template 402 from event repository 355, shown in FIG. 3 and/or FIG. 4, as a template for rapidly creating the requested event, e.g., event 401.

In operation 750 of process 700, the event that was associated with the located event template 402, e.g., event 401, is reconstructed from that template, and in accordance with criteria dictated by the publisher, has pertinent values associated therewith the new event 401 updated, e.g., marshaling. In an embodiment of the present disclosure, the publisher requesting to publish event 401 marshals event 401.

In operation 760 of process 700, subsequent to a publisher performing the marshaling of event 401 (e.g., updating pertinent values), event 401 is published to event queue 160, (as shown in FIGS. 3 and 4) in accordance with embodiments of the present disclosure. Once an event, e.g., event 401 is published to a queue, e.g., event queue 160, event 401 can be propagated from queue 160 to all the subscribers of database 150 that expressed an interest in event 401. It is noted that event 401 may also be propagated to additional databases, e.g., database 151, when subscribers to those additional databases, e.g., 151, have expressed an interest in event 401, as shown in FIG. 4.

Figure 8:
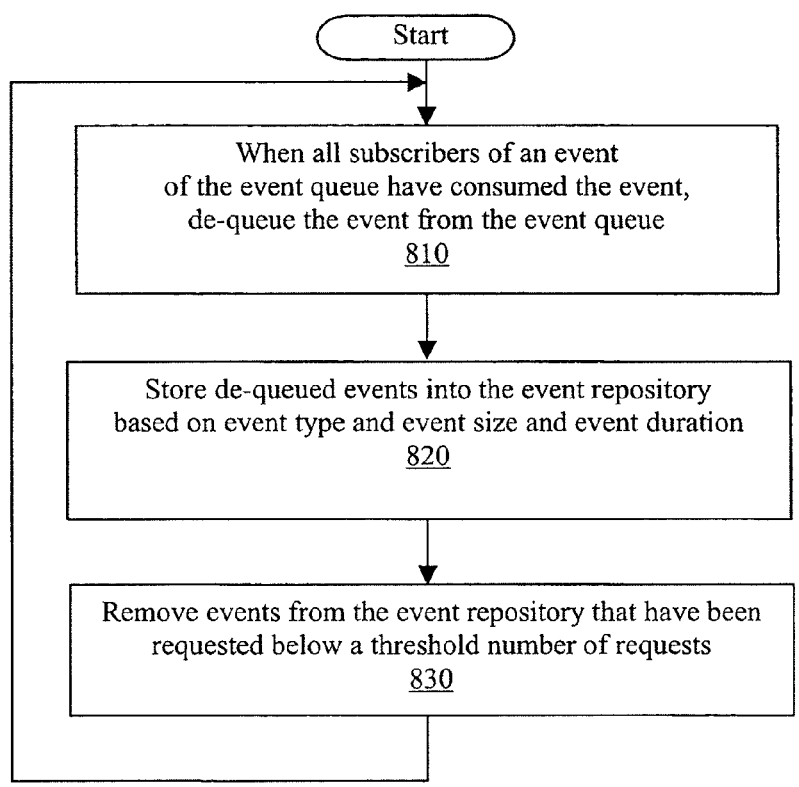
FIG. 8 is another flowchart of a process for utilization of an event repository in accordance with embodiments of the present disclosure.

FIG. 8 is a flowchart 800 of steps performed for utilizing a high performance, scalable, adaptable and multi-dimensional event repository, in accordance with embodiments of the present disclosure. Flowchart 800 includes processes of the present disclosure which, in one embodiment, are carried out by processors and electrical components under the control of computer readable and computer executable instructions. The computer readable and computer executable instructions reside, for example, in data storage features such as computer usable volatile memory 202 and/or computer usable non-volatile memory 203 and/or data storage device 204 of FIG. 2. However, the computer readable and computer executable instructions may reside in any type of computer readable medium. Although specific steps are disclosed in flowchart 800, such steps are exemplary. That is, the present disclosure is well suited to performing various other steps or variations of the steps recited in FIG. 8. Within the present embodiment, it should be appreciated that the steps of flowchart 700 may be performed by software, by firmware, by hardware or by any combination of software, firmware and hardware.

In operation 810 of process 800, upon a database, e.g., database 150 or database 151, receiving an indication, e.g., event consumption confirmation 404 and 403 (FIGS. 4 and 5), respectively, that all subscribers expressing an interest in a particular event, e.g., event 401, have consumed event 401, event 401 is removed (de-queued) from the event queue, event queue 160, in which event 401 was stored (as shown in FIG. 5), in accordance with embodiments of the present disclosure.

In operation 820 of process 800, upon removing event 401 from event queue 160, a template of the particular event, e.g., event template 402, is then placed in an event repository, e.g., event repository 355 (FIGS. 3 and 4), in an embodiment of the present disclosure. In an embodiment of the present disclosure, and as shown in FIG. 6, event template 402 may be placed in event repository based on event type. In another embodiment, event template 402 may be placed in event repository 355 based on event shape. In still another embodiment, event template 402 may be placed in event repository 355 based on duration. In yet another embodiment, event template 402 may be placed in event repository based on event type and event shape. In an additional embodiment, event template 402 may be placed in event repository 355 based on a combination of event type, event shape and event duration.

In operation 830 of process 800, when particular events in event repository 355 are less frequently requested than other events and/or when the number of requests for a particular event is/are below a threshold minimum and/or the volume of event templates stored therein exceed a maximum threshold, embodiments of the present disclosure provide removing those events from the event repository. In an embodiment, an event template may be removed from an event repository based on the event associated with the event template receiving fewer requests to publish compared to other events, as described in FIG. 6. In another embodiment, an event template may be removed from an event repository based on requests for that event falling below a minimum threshold number of requests, also described in FIG. 6.

Thus, embodiments of the present disclosure are drawn to providing a method for a high-performance, scalable, adaptable, multi-dimensional event repository. Further, by virtue of the event repository enabled to retain events in a logical manner, retrieval of those events in the event repository consumes less time and fewer system resources when compared to creating a new analogous event. Additionally, the event repository is enabled to adjust the volume of events stored therein such that system performance is not compromised.

The foregoing descriptions of specific embodiments of the present disclosure have been presented for purposes of illustration and description. They are not intended to be exhaustive or to limit the disclosure to the precise forms disclosed, and many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the Claims appended hereto and their equivalents.

For the Examiner's convenience, Applicants note that this application is a continuation of U.S. application Ser. No. 12/649,209 and U.S. Pat. No. 7,664,784. The claims of the present application are different and possibly, at least in some aspects, broader in scope than the claims pursued in the parent applications. To the extent any prior amendments or characterizations of the scope of any claim or cited document made during prosecution of the parent could be construed as a disclaimer of any subject matter supported by the present disclosure, Applicants hereby rescind and retract such disclaimer. Accordingly, the references previously presented in the parent applications may need to be revisited.

What is claimed is:

1. A computer-implemented method, comprising:
    intercepting, by a computer system, a request to publish an event to a database, the intercepting performed by a messaging system operable with the database;
    examining, by the computer system, an event repository for an event template associated with the event, the examining performed by the messaging system, the event repository communicatively coupled with the database and the messaging system;
    removing event templates from the event repository having requests that are below a threshold;
    retrieving the event template from the event repository;
    marshaling the event template to create the event; and
    publishing the event in an event queue by placing the event into the event queue.

2. The method of claim 1, further comprising removing the event from the event queue of the database in response to a subscriber expressing an interest in the event having consumed the event.

3. The method of claim 2, further comprising storing the event in the event repository once the event is removed from the event queue.

4. The method of claim 1, further comprising propagating the event to a subscriber of the database expressing an interest in the event.

5. The method of claim 1, further comprising removing event templates from the event repository having requests that are below a threshold.

6. The method of claim 1, further comprising reconstructing the event from the template of the event when the event is located in the event repository.

7. The method of claim 6, further comprising updating values associated with the event upon reconstruction of the event.

8. A system, comprising:
    a memory configured to store computer-executable instructions; and
    a processor configured to access the memory and execute the computer-executable instructions to at least:
        intercept a request to publish an event to a database, the intercepting performed by a messaging system operable with the database;
        examine an event repository for an event template associated with the event, the examining performed by the messaging system, the event repository communicatively coupled with the database and the messaging system;
        remove event templates from the event repository having requests that are below a threshold;
        retrieve the event template from the event repository;
        marshal the event template to create the event; and
        publish the event in an event queue.

9. The system of claim 8, wherein the processor is further configured to execute the computer-executable instructions to at least remove the event from the event queue of the database in response to a subscriber expressing an interest in the event having consumed the event.

10. The system of claim 9, wherein the processor is further configured to execute the computer-executable instructions to at least store the event in the event repository once the event is removed from the event queue.

11. The system of claim 8, wherein the processor is further configured to execute the computer-executable instructions to at least propagate the event to a subscriber of the database expressing an interest in the event.

12. The system of claim 8, wherein the processor is further configured to execute the computer-executable instructions to at least reconstruct the event from the template of the event when the event is located in the event repository.

13. The system of claim 12, wherein the processor is further configured to execute the computer-executable instructions to at least update values associated with the event upon reconstruction of the event.

14. A non-transitory computer-readable storage medium configured with computer-executable instructions that, when executed by a computer system, cause the computer system to perform operations comprising:
    intercepting, by a computer system, a request to publish an event to a database, the intercepting performed by a messaging system operable with the database;
    examining, by the computer system, an event repository for an event template associated with the event, the examining performed by the messaging system, the event repository communicatively coupled with the database and the messaging system;
    retrieving the event template from the event repository;
    removing event templates from the event repository having requests that are below a threshold;
    marshaling the event template to create the event; and
    publishing the event in an event queue.

15. The non-transitory computer-readable storage medium of claim 14, further comprising removing the event from the event queue of the database in response to a subscriber expressing an interest in the event having consumed the event.

16. The non-transitory computer-readable storage medium of claim 15, further comprising storing the event in the event repository once the event is removed from the event queue.

17. The non-transitory computer-readable storage medium of claim 14, further comprising propagating the event to a subscriber of the database expressing an interest in the event.

18. The non-transitory computer-readable storage medium of claim 14, further comprising:
   reconstructing the event from the template of the event when the event is located in the event repository; and
   updating values associated with the event upon reconstruction of the event.

* * * * *

UNITED STATES PATENT AND TRADEMARK OFFICE
CERTIFICATE OF CORRECTION

PATENT NO. : 9,063,961 B2
APPLICATION NO. : 14/154154
DATED : June 23, 2015
INVENTOR(S) : Venkatesan et al.

It is certified that error appears in the above-identified patent and that said Letters Patent is hereby corrected as shown below:

Title Page

On page 2, column 2, item (56) under other publications, line 3, delete "Allownace"," and insert -- Allowance", --, therefor.

In the Specification

In column 14, line 9, delete "WHMP," and insert -- WMHP, --, therefor.

In column 14, line 18, delete "(WHMP)" and insert -- (WMHP) --, therefor.

Signed and Sealed this
Eighth Day of March, 2016

Michelle K. Lee
*Director of the United States Patent and Trademark Office*